United States Patent
Sugimoto et al.

(10) Patent No.: US 9,692,216 B2
(45) Date of Patent: Jun. 27, 2017

(54) ELECTRIC WIRE PROTECTIVE TUBE

(71) Applicant: YAZAKI CORPORATION, Tokyo (JP)

(72) Inventors: Masahisa Sugimoto, Shizuoka (JP); Makoto Katsumata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/204,545

(22) Filed: Jul. 7, 2016

(65) Prior Publication Data

US 2016/0322796 A1    Nov. 3, 2016

Related U.S. Application Data

(63) Continuation of application No. PCT/JP2015/051717, filed on Jan. 22, 2015.

(30) Foreign Application Priority Data

Feb. 28, 2014  (JP) .................... 2014-037923

(51) Int. Cl.
*H02G 3/04* (2006.01)
*B60R 16/02* (2006.01)

(52) U.S. Cl.
CPC ....... *H02G 3/0462* (2013.01); *B60R 16/0215* (2013.01); *H02G 3/0468* (2013.01)

(58) Field of Classification Search
CPC ...... H02G 3/04; H02G 3/0406; H02G 3/0462; H02G 3/0468; H02G 3/06; B60E 16/0215;
(Continued)

(56) References Cited

U.S. PATENT DOCUMENTS 6,051,789 A * 4/2000 Kato .................... H02G 3/0468
174/68.3
8,124,887 B2 * 2/2012 Suzuki ................ B60R 16/0215
174/68.3

(Continued)

FOREIGN PATENT DOCUMENTS

DE    197 25 051 A1    12/1998
EP    1 201 981 A1    5/2002
(Continued)

OTHER PUBLICATIONS

International Search Report and Written Opinion of the International Search Report for PCT/JP2015/051717 dated Mar. 17, 2015.
(Continued)

*Primary Examiner* — Angel R Estrada
(74) *Attorney, Agent, or Firm* — Kenealy Vaidya LLP (57) ABSTRACT

An electric wire protective tube is configured such that a straight tube section in a shape of a straight tube and a bendable tube section that is bendable are provided along a longitudinal direction, and is configured to have a shape of a tube that allows an electric wire to be arranged therein. The electric wire protective tube has a tubular inner shield portion made of an electrically conductive material and forming an inner surface of the tube, and an exterior portion made of resin and forming an outer surface of the tube. The inner shield portion is provided such that it is firmly attached to an inner surface of the exterior portion in the straight tube section, and such that it is separable from an inner surface of the exterior portion in the bendable tube section.

3 Claims, 5 Drawing Sheets

(58) Field of Classification Search
CPC ...... B60E 16/0207; H01B 7/0045; F16L 5/00; F16L 9/22; F16L 7/00; F16L 11/00; F16L 25/0036; B60R 16/0215; B60R 16/0207
USPC .............. 174/72 A, 68.1, 68.3, 72 C, 36, 92, 174/72 TR, 88 R, 70 C; 138/121, 118, 138/156, 128, 159, 162, 166, 167, 168, 138/109; 248/73, 74.2, 74.1, 205.2, 248/205.3, 205.6, 49, 68.1

See application file for complete search history.

(56) References Cited

U.S. PATENT DOCUMENTS

| | | | |
|---|---|---|---|
| 8,569,622 B2* | 10/2013 | Katou | B60R 16/0215 174/68.3 |
| 9,387,818 B2* | 7/2016 | Sugimoto | H02G 3/0468 |
| 9,412,491 B2* | 8/2016 | Inao | B60R 16/0215 |
| 2014/0110012 A1 | 4/2014 | Omura et al. | |
| 2015/0014017 A1 | 1/2015 | Sugimoto et al. | |

FOREIGN PATENT DOCUMENTS

| | | |
|---|---|---|
| JP | 2007-66825 A | 3/2007 |
| JP | 2007-221085 A | 8/2007 |
| JP | 2010-260241 A | 11/2010 |
| JP | 2012-175879 A | 9/2012 |
| JP | 2013-17318 A | 1/2013 |
| JP | 2013-211963 A | 10/2013 |

OTHER PUBLICATIONS

English language Written Opinion of the International Search Report for PCT/JP2015/051717 dated Mar. 17, 2015.
Chinese Office Action for the related Chinese Patent Application No. 201580011221.1 dated Mar. 29, 2017.

* cited by examiner

ELECTRIC WIRE PROTECTIVE TUBE

CROSS REFERENCE TO RELATED APPLICATIONS

This application is a continuation of International Patent Application No. PCT/JP2015/051717 filed on Jan. 22, 2015, claiming priority from Japanese Patent Application No. 2014-037923 filed on Feb. 28, 2014, the contents of which are incorporated herein by reference.

FEILD OF INVENTION

The present invention relates to an electric wire protective tube that covers an electric wire.

BACKGROUND ART

Conventionally, a wire harness or the like for use in an electric wiring in an automobile has been configured to protect one or more electric wires by wrapping a tape around the one or more electric wires or by placing them inside an electric wire protective tube. Some electric wire protective tubes allows a three dimensional arrangement of electric wires, and at the same time, have electromagnetic shielding effect. More specifically, the electric wire protective tube is configured such that a straight tube section having a shape of a straight tube and a bendable tube section that is bendable are provided along a longitudinal direction, and is configured to have a tubular shape inside which the electric wires can be arranged, and a tubular inner shield portion forming an inner surface of the tube and an exterior portion forming an outer surface of the tube are provided. For example, a related art electric wire protective tube has an inner shield portion made of metal material and firmly attached to an inner surface of an exterior portion of a bendable tube section made of resin (see. e.g., JP2012-175879A).

However, the electric wire protective tube described in Patent Document 1 is bent in a state in which the inner shield portion and the exterior portion are firmly attached to each other. Thus, an increase of a strain of the inner shield portion due to a stress exerted from the exterior portion to the inner shield portion may cause a damage of the inner shield portion, which may result in a deterioration of the electromagnetic shielding effect.

SUMMARY

Illustrative aspects of the present invention provide an electric wire protective tube in which deterioration of electromagnetic shielding effect in a bendable section can be prevented.

(1) According to an illustrative aspect of the present invention, an electric wire protective tube is configured such that a straight tube section having a shape of a straight tube and a bendable tube section that is bendable are provided along a longitudinal direction, and configured to have a shape of a tube that allows an electric wire to be arranged therein, the electric wire protective tube having a tubular inner shield portion made of an electrically conductive material and forming an inner surface of the tube, and an exterior portion made of resin and forming an outer surface of the tube, wherein the inner shield portion is provided such that the inner shield portion is firmly attached to an inner surface of the exterior portion in the straight tube section, and such that the inner shield portion is separable from the inner surface of the exterior portion in the bendable tube section.

(2) An inner diameter of the exterior portion may be larger in the bendable tube section than in the straight tube section, and the inner shield portion is provided such that a clearance gap is formed between the inner shield portion and the inner surface of the exterior portion in the bendable tube section.

(3) The exterior portion in the bendable tube section may be formed in a corrugated shape.

According to the electric wire protective tube having the configuration of (1) described above, when the bendable tube section is bent along a wiring route of the electric wire, the inner shield portion is bent in a state in which it is separated from the exterior portion. Accordingly, the inner shield portion can be bent without being affected by a stress from the exterior portion. Therefore, it is possible to prevent a damage of of the inner shield portion, and as a result, it is possible to prevent a deterioration of the electromagnetic shielding effect in the bendable section.

According to the electric wire protective tube having the configuration of (2) described above, when molding the exterior portion by extruding the resin, in molding the bendable tube section, the resin extruded between a die and a material of the inner shield portion is made unlikely to stick to the material of the inner shield portion, whereas in molding the straight tube section, the resin extruded between the die and the material of the inner shield portion easily sticks to the material for the inner shield portion. Therefore, it is possible to easily perform the molding of the electric wire protective tube.

The electric wire protective tube having the configuration of (3) described above can be easily bent because the exterior portion in the bendable tube section is formed in a corrugated shape.

EMBODIMENTS OF INVENTION

Hereinafter, an embodiment of an electric wire protective tube according to the present invention will be described in detail with reference to the drawings. FIGS. 1 to 5 illustrate an electric wire protective tube 1 in which electric wires W are provided. The electric wire protective tube 1 according to the embodiment of the present invention is configured, for example, to cover the electric wires W of a wire harness for electrically interconnecting high voltage devices in a hybrid car or an electric car.

The electric wire protective tube 1 according to this embodiment is configured such that a straight tube section A in a shape of a straight tube and a bendable tube section B that is bendable are provided along a longitudinal direction, and is configured to have a shape of a tube to allow the electric wires W to be arranged therein, and the electric wire protective tube 1 has a tubular inner shield portion 10 forming an inner surface of the tube, and an exterior portion 20 forming an outer surface of the tube. In the following, the inner shield portion 10 will be denoted by a reference sign 10A with respect to the straight tube section A, and by a reference sign 10B with respect to the bendable tube section B. The exterior portion 20 will be denoted by a reference sign 20A with respect to the straight tube section A, and by a reference sign 20B with respect to the bendable tube section B.

The exterior portion 20 is made of an insulating resin such as synthetic resin. The exterior portion 20A in the straight tube section A is formed using a larger amount of wall thickness part as compared with the exterior portion 20B in the bendable tube section B, thereby improving rigidity to maintain its straight shape. More specifically, the rigidity of the straight tube section A is improved by providing reinforcing ribs 22 side by side in the longitudinal direction, each of the reinforcing ribs 22 being provided in a convex shape and along a circumferential direction of the exterior portion 20A.

The exterior portion 20B in the bendable tube section B is formed in a corrugated shape, so that the exterior portion 20B is bendable.

The inner shield portion 10 is made of a metal foil such as copper in a tubular shape, and shields the electric wires W inside the electric wire protective tube 1 from external electromagnetic waves. This inner shield portion 10 is provided such that it is firmly attached to an inner surface 20a of the exterior portion 20A in the straight tube section A, and such that it is separable from an inner surface 20b of the exterior portion 20B in the bendable tube section B.

More specifically, the inner shield portion 10B is provided such that a clearance gap is provided between the inner shield portion 10B and the inner surface 20b of the exterior portion 20B in the bendable tube section B. For this reason, an inner diameter of the exterior portion 20B in the bendable tube section B is adjusted to be larger than that of the straight tube section A. Accordingly, when molding the bendable tube section B by a die pressing as will be described below a space between dies T1, 12 and a metal foil 11 as the material for the inner shield portion 10 is made larger as compared with when molding the straight tube section A molded by die pressing, and therefore the resin 21 extruded between the dies T1, T2 and the metal foil 11 is made unlikely to stick to the metal foil 11.

Figure 1:
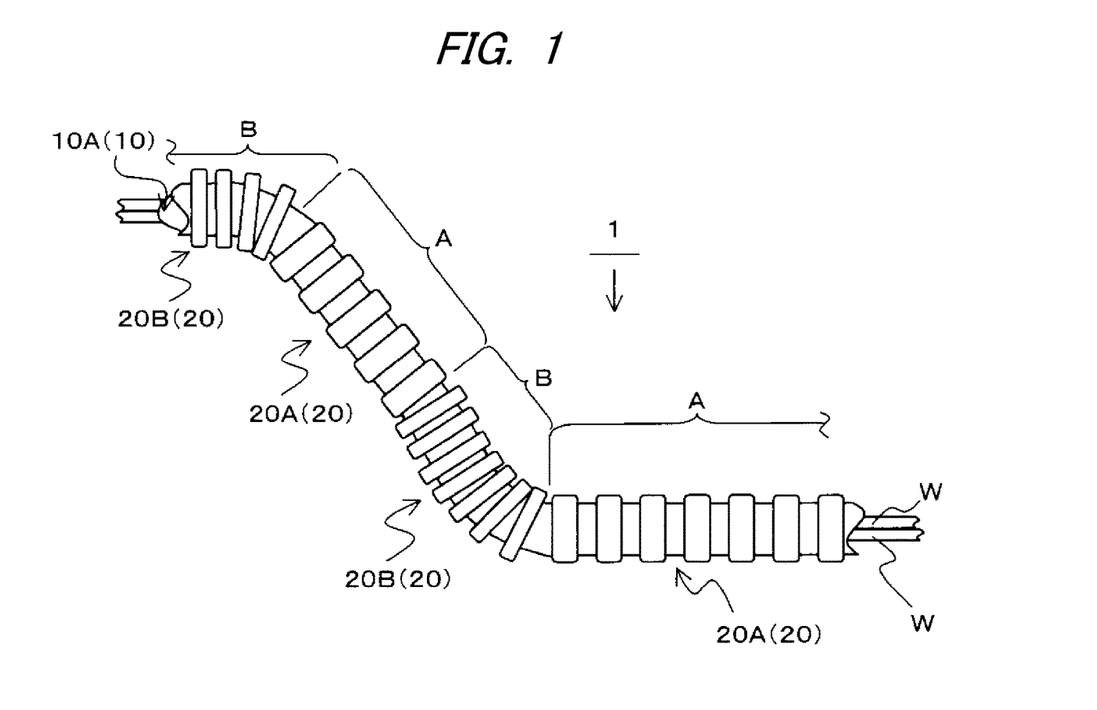
FIG. 1 is a view of an electric wire protective tube according to an embodiment of the present invention.
Figure 2:
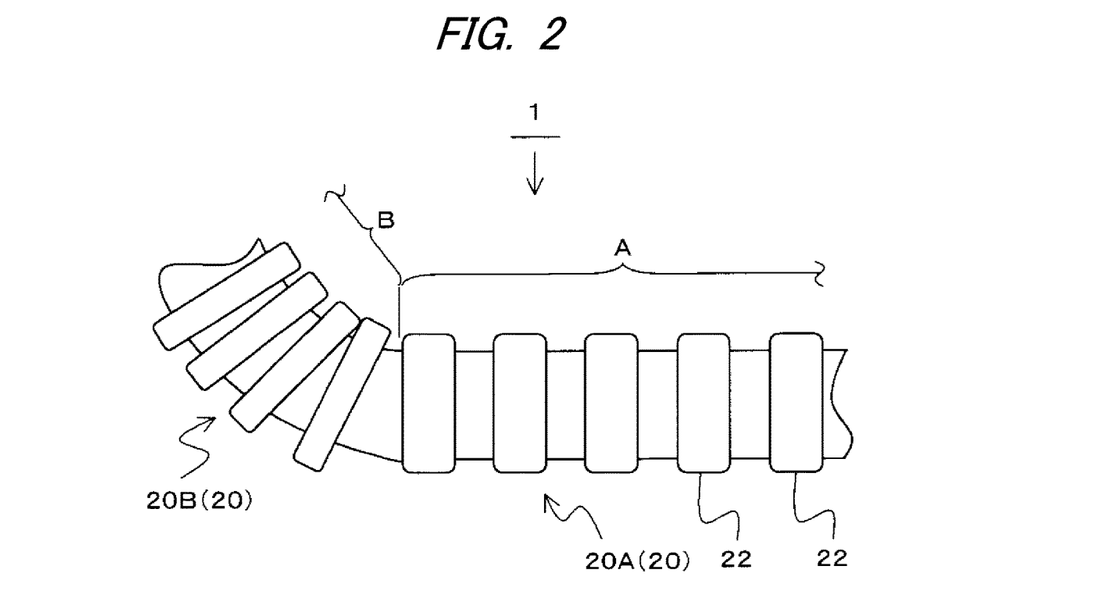
FIG. 2 is an enlarged view of a portion around a boundary between a straight tube section and a bendable tube section of the electric wire protective tube illustrated in FIG. 1.
Figure 3:
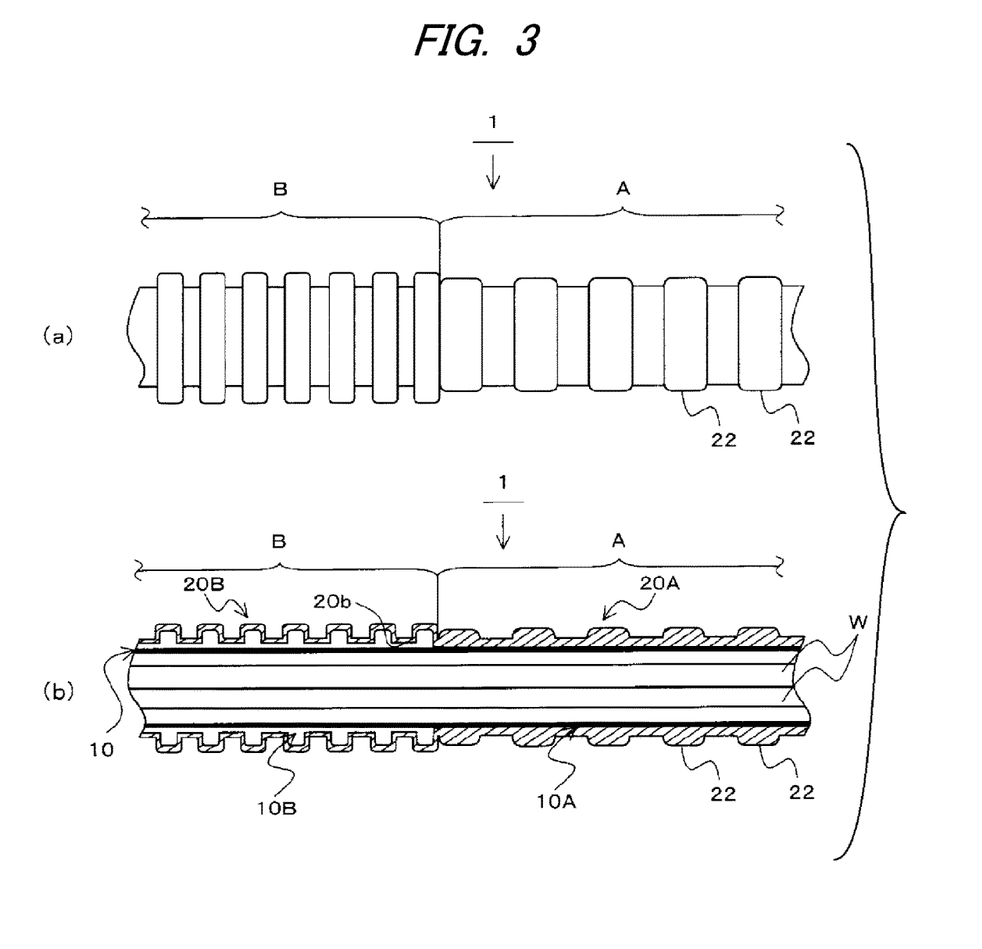
FIG. 3 illustrates (a) a view of the electric wire protective tube in a state in which the bendable tube section is extended in a straight shape along the straight tube section and (b) a sectional view of (a) of FIG. 3.
Figure 4:
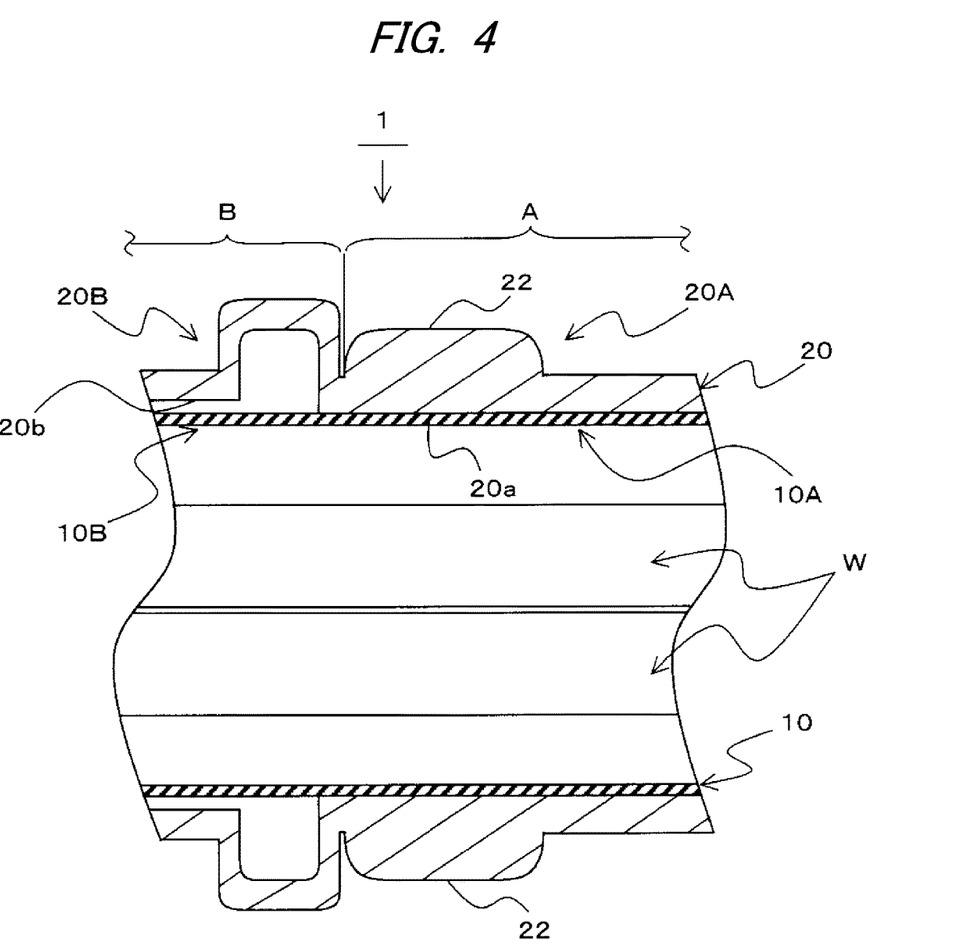
FIG. 4 is an enlarged view of a portion around a boundary between the straight tube section and the bendable tube section in (b) of FIG. 3.
Figure 5:
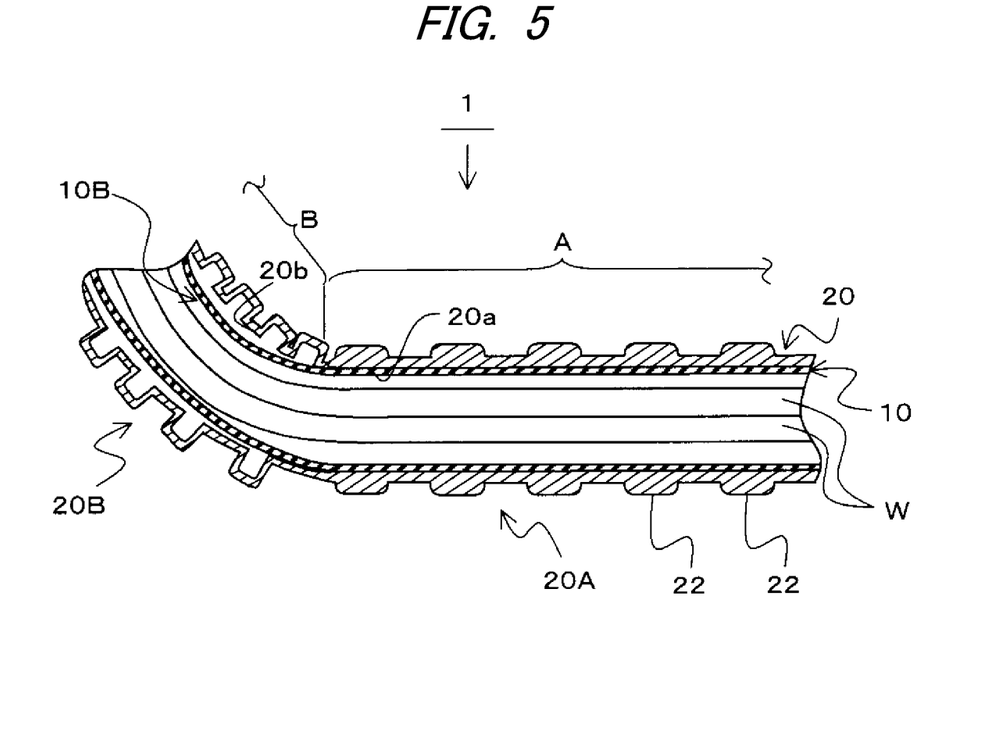
FIG. 5 is a sectional view of the electric wire protective tube illustrated in FIG. 2.

In the electric wire protective tube 1 as described above, in a case where the electric wires W are arranged such that the bendable tube section B is bent, the inner shield portion 10 can be bent without being affected by a stress from the exterior portion 20B, because the inner shield portion 10 is provided so as to be separable from the inner surface 20b of the exterior portion 20B in the bendable tube section B as shown in FIG. 5, while the inner shield portion 10 is fixed to the exterior portion 20A because it is firmly attached to the inner surface 20a of the exterior portion 20A in the straight tube section A.

Generally, the high tension electric wires W are arranged three-dimensionally at a bending angle of 90 degree or less. For this reason, strain of the inner shield portion 10B of the bendable tube section B is depressed to 25% or less, even at an outer side of the bent section where the strain is greater than at an inner side of the bent section. Therefore, it is possible to prevent damage by bending, even though an electrolytic copper foil, for example, is used as the metal foil to be used for the inner shield portion 10.

Figure 6:
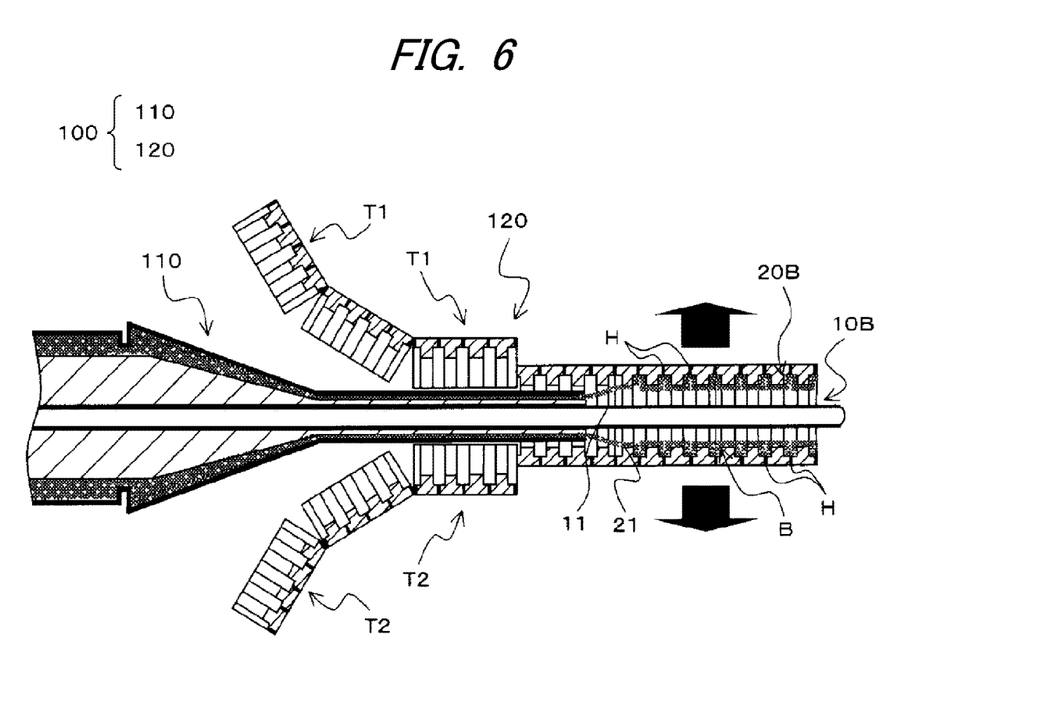
FIG. 6 is a view illustrating a state in which the bendable tube section is being molded by an extruder machine.
Figure 7:
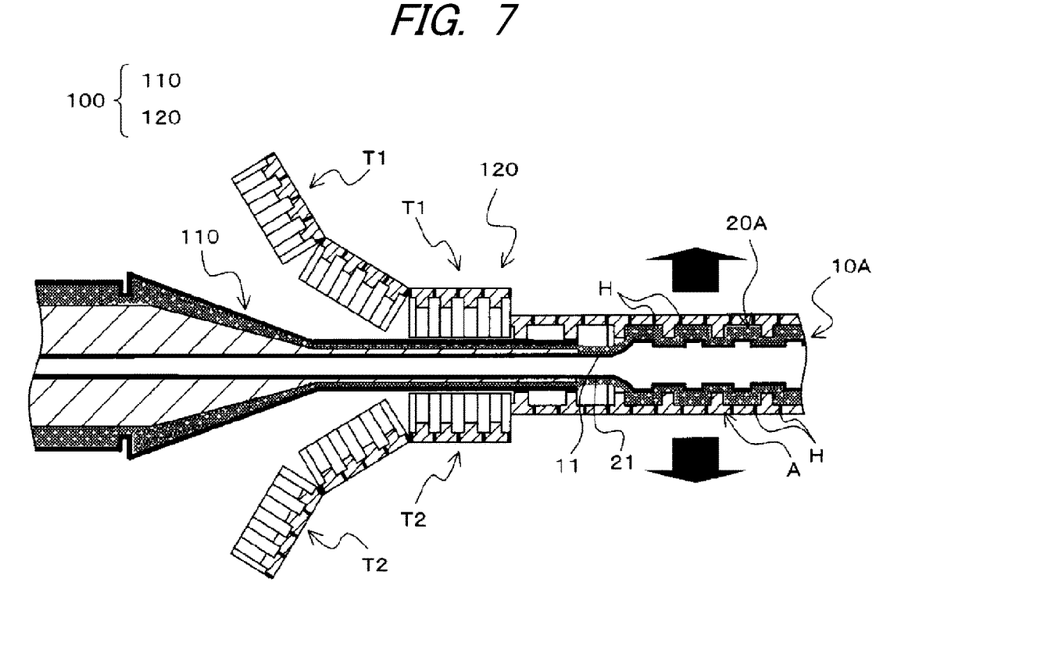
FIG. 7 is a view illustrating a state in which the straight tube section is being molded by the extruder machine.

Next, a method for manufacturing the electric wire protective tube 1 will be described with reference to FIGS. 6 and 7. FIG. 6 is a view illustrating a state in which the bendable tube section B is being molded by an extruder machine 100. FIG. 7 is a view illustrating a state in which the straight tube section A is being molded by the extruder machine 100.

The extruder machine 100 is used to manufacture the electric wire protective tube 1. This extruder machine 100 includes an extruding section 110, so called a cross head, and a molding section 120 configured to continuously mold, by die pressing, the resin 21 fed from the extruding section 110.

The extruding section 110 feeds both the tubular metal foil 11 as the material for the inner shield portion 10 and the resin 21 as material for the exterior portion 20 to the molding section 120 at the same time.

In the molding section 120, a plurality of upper dies T1 and lower dies T2 corresponding to the straight tube section A and the bendable tube section B are respectively provided above and below in a caterpillar shape. Molding material which is supplied from the extruding section 110 to a die pressing position is molded by die pressing with the upper and lower dies T1, T2.

The molding section 120 uses a vacuum system in which the molding material is suctioned into the upper and lower dies T1, T2, using air intake holes H that are formed in the upper and lower dies T1, T2.

In a case where the bendable tube section B is molded using the extruder machine 100 as described above, the upper and lower dies T1, T2 corresponding to the bendable tube section B are disposed at the die pressing position, and then, closed, in a state in which the resin 21 which is supplied from the extruding section 110 to the die pressing position and the metal foil 11 are interposed between them.

The upper and lower dies T1, T2 corresponding to the bendable tube section B are formed such that a clearance gap can be easily formed between the resin 21 fed from the extruding section 110 to the die pressing position and the metal foil 11, on that the resin 21 and the metal foil 11 do not stick each other. More specifically, an inner diameter of the upper and lower dies T1, T2 corresponding to the bendable tube section B in a closed state is made larger, and a space between the upper and lower dies T1, T2 and the metal foil 11 is made larger, as compared with the upper and lower dies T1, T2 corresponding to the straight tube section A. Therefore, the resin 21 extruded between the upper and lower dies T1, T2 and the metal foil 11 is unlikely to stick to the metal foil 11. Accordingly, the resin 21 and the metal foil 11 are placed at the die pressing position in a state separable from each other.

Thereafter, the extruder machine 100 performs vacuum treatment, thereby suctioning only the resin 21 into the upper and lower dies T1, T2, and the exterior portion 20B is molded in a corrugated shape. Meanwhile, the inner shield portion 10B is provided so as to be separable from the inner surface 20b of the exterior portion 20B.

On the other hand, when molding the straight tube section A using the extruder machine 100, the upper and lower dies T1, T2 corresponding to the straight tube section A are disposed at the die pressing position, and then, closed, in a state in which the resin 21 fed from the extruding section 110 to the die pressing position and the metal foil 11 are interposed between them.

Because the upper and lower dies T1, T2 corresponding to the straight tube section A are adjusted to have a smaller diameter than the upper and lower dies T1, T2 corresponding to the bendable tube section B, the resin fed from the extruding section 110 to the die pressing position and the metal foil 11 easily stick to each other. Accordingly, the resin 21 and the metal foil 11 are placed in the die pressing position in a state in which they are stuck to each other.

Thereafter, the extruder machine 100 carries out the vacuum treatment, using the air intake holes H, thereby suctioning the resin 21, to which the metal foil 11 is stuck, into the upper and lower dies T1, T2. As a result, the exterior portion 20A is formed in a straight shape in a state in which the inner shield portion 10A is firmly attached to the inner surface 20a of the exterior portion 20A. Thereafter, the electric wire protective tube 1 which has been molded by die pressing in the molding section 120 is subjected to a cooling treatment for setting the resin 21, whereby the electric wire protective tube 1 is completed.

In the electric wire protective tube 1 according to the embodiment of the present invention, when bending the bendable tube section B along the wiring route of the electric wires W, the inner shield portion 10 is bent in a state in which it is separated from the exterior portion 20. Accordingly, the inner shield portion 10 can be bent without being affected by the stress from the exterior portion 20. Therefore, with in the electric wire protective tube 1, it is possible to prevent a damage of the inner shield portion 10, and as a result, it is possible to prevent a deterioration of the electromagnetic shielding effect in the bendable section.

Further, in the electric wire protective tube 1 according to the embodiment of the present invention, when molding the exterior portion 20 by extruding the resin 21, in molding the bendable tube section B, the resin 21 extruded between the upper and lower dies T1, T2 and the metal foil 11 as the material of the inner shield portion 10 is made unlikely to stick to the metal foil 11. On the other hand, in molding the straight tube section A, the resin 21 extruded between the upper and lower dies T1, T2 and the metal foil 11 easily sticks to the metal foil 11. Therefore, it is possible to easily perform the molding of the electric wire protective tube 1.

Further, the electric wire protective tube 1 according to the embodiment of the present invention can be easily bent because the exterior portion 20B in the bendable tube section B is formed in a corrugated shape.

While the electric wire protective tube 1 according to the embodiment of the present invention has been described as an example in which the inner diameter of the exterior portion 20 in the bendable tube section B is adjusted to be larger than that of the straight tube section A, this is not necessarily the case, and the inner diameter of the exterior portion 20B in the bendable tube section B may be equal to the inner diameter of the exterior portion 20A in the straight tube section A, in so far as the inner shield portion 10 is provided such that it is firmly attached to the inner surface 20a of the exterior portion 20A in the straight tube section A and such that it is separable from the inner surface 20b of the exterior portion 20B in the bendable tube section B.

Further, while the electric wire protective tube 1 according to the embodiment of the present invention has been described as an example in which the exterior portion 20B in the bendable tube section B is formed in a corrugated shape, this is not necessarily the case, and the exterior portion 20B may have other shapes in so far as it is bendable. For example, the exterior portion 209 in the bendable tube section B may have a shape of a straight tube, provided that it is bendable.

Further, while the electric wire protective tube 1 according to the embodiment of the present invention has been described as an example in which the inner shield portion 10 is made of a metal foil such as copper in a tubular shape, this is not necessarily the case, and the inner shield portion 10 may be made of other material, in so far is it is made of electrically conductive material in a tubular shape. For example, a metal braid made of other conductive material than copper may be used as the inner shield portion 10.

Here, aspects of the electric wire protective tube according to the embodiment of the present invention as described above will be briefly summarized and listed below.

[1] An electric wire protective tube (1) configured such that a straight tube section (A) in a shape of a straight tube and a bendable tube section (B) that is bendable are provided along a longitudinal direction, and configured to have a shape of a tube that allows an electric wire (W) to be arranged therein. The electric wire protective tube has a tubular inner shield portion (10) made of an electrically conductive material and forming an inner surface of the tube, and an exterior portion (20) made of resin and forming an outer surface of the tube. The inner shield portion (10) is provided such that it is firmly attached to an inner surface (20a) of the exterior portion (20A) in the straight tube section (A), and such that it is separable from an inner surface (20b) of the exterior portion (20B) in the bendable tube section (B).

[2] The electric wire protective tube (1) according to [1] described above, wherein an inner diameter of the exterior portion (20B) is adjusted to be larger in the bendable tube section (B) than in the straight tube section (A), and the inner shield portion (10B) is provided such that a clearance gap is formed between the inner shield portion (10B) and the inner surface (20b) of the exterior portion (20B) in the bendable tube section (B).

[3] The electric wire protective tube (1) according to [1] or [2] described above, wherein the exterior portion (20B) in the bendable tube section (B) is formed in a corrugated shape.

While the invention made by the inventors has been described above in detail with reference to the embodiments of the invention, the present invention is not limited to the embodiments described above, and various changes may be made therein without departing from the subject matter of the invention.

What is claimed is:

1. An electric wire protective tube configured such that a straight tube section having a shape of a straight tube and a bendable tube section that is bendable are provided along a longitudinal direction, and configured to have a shape of a tube that allows an electric wire to be arranged therein, the electric wire protective tube comprising:
    a tubular inner shield portion made of an electrically conductive material and forming an inner surface of the tube; and
    an exterior portion made of resin and forming an outer surface of the tube,
    wherein the inner shield portion is firmly attached to an inner surface of the exterior portion in the straight tube section, and the inner shield portion is separated from the inner surface of the exterior portion in the bendable tube section such that the inner shield portion is movable relative to the inner surface of the exterior portion.

2. The electric wire protective tube according to claim 1, wherein inner diameter of the exterior portion is larger in the bendable tube section than in the straight tube section, and wherein the inner shield portion is provided such that a clearance gap is formed between the inner shield portion and the inner surface of the exterior portion in the bendable tube section.

3. The electric wire protective tube according to claim 1, wherein the exterior portion in the bendable tube section is formed in a corrugated shape.

\* \* \* \* \*